United States Patent [19]

Seo

[11] Patent Number: 5,696,562

[45] Date of Patent: Dec. 9, 1997

[54] ON-SCREEN SIGNAL GENERATING APPARATUS FOR A CABLE TELEVISION

[75] Inventor: Ho-Il Seo, Kyonggi-Do, Rep. of Korea

[73] Assignee: Hyundai Electronics Industries Co., Ltd., Rep. of Korea

[21] Appl. No.: 364,706

[22] Filed: Dec. 28, 1994

[30] Foreign Application Priority Data

Dec. 29, 1993 [KR] Rep. of Korea .......................... 30536

[51] Int. Cl.[6] .................................................. H04N 5/445
[52] U.S. Cl. ................................... 348/564; 348/569
[58] Field of Search .......................... 348/10, 11, 563, 348/564, 569, 570, 584, 585, 586, 589, 590, 593–600; 345/25, 26, 27, 28, 113, 114, 115, 141, 902; H04N 7/10, 5/262, 5/265, 5/272, 5/275, 5/278, 9/76, 9/74, 9/75, 5/445

[56] References Cited

U.S. PATENT DOCUMENTS

| | | | |
|---|---|---|---|
| 4,591,897 | 5/1986 | Edelson | 348/585 |
| 5,317,391 | 5/1994 | Banker et al. | |
| 5,355,162 | 10/1994 | Yozolino et al. | 348/11 |

Primary Examiner—David E. Harvey
Attorney, Agent, or Firm—David M. Klein; Bryan Cave LLP

[57] ABSTRACT

An on-screen signal generating apparatus for a cable television system is capable of displaying the control commands from a remote control while watching television. A memory circuit stores color information for each pixel needed for displaying the control commands on the screen. A main control circuit receives the color information stored in the memory circuit for output to RGB latches, and generates input/output port selection signals and writing signals for latches. The latches output the pixel data to D/A convertors for converting the display data to analog format. The analog signals are then combined with the original video signal.

8 Claims, 3 Drawing Sheets

ON-SCREEN SIGNAL GENERATING APPARATUS FOR A CABLE TELEVISION

BACKGROUND OF THE INVENTION

1. Field of the Invention

The present invention relates generally to an on-screen signal generating apparatus for a cable television, and more particularly to an on-screen signal generating apparatus for a cable television, capable of displaying the control commands from the keypad or the remote controller on the television screen while watching a television program.

2. Description of the Conventional Art

Conventionally, as shown in FIG. 1, a cable television signal generating apparatus includes a decoder circuit 100 for decoding input combined video signals CVBS into audio signals S1 and S2 and video signals vs and for transmitting these signals to an external audio system and a VCR(Video Cassette Tape Recorder); and a high frequency wave modulation circuit 101 for modulating the audio signals S1 and S2 and the video signals VS, which are decoded at the television decoder circuit 100, in a form of the high frequency wave and for transmitting the signals to the video system and the audio system of the television as television display video signals RFCVBS.

As mentioned above, the input combined video signals CVBS of the conventional cable television signals generating apparatus are decoded to left and right audio signals S1 and S2 through the television decoder circuit 100, and inputted into the high frequency modulation circuit 101 and transmitted to the external audio system and the VCR.

The high frequency modulation circuit 101 modulates the left and right audio signals S1 and S2 and the video signal VS, which are decoded at the television decoder 100, and transmits the modulated signals to the video system and the audio system of the television as television display video signals RF CVBS.

However, the conventional cable television signal generating apparatus includes many types of channels, remote controllers or keypads for controlling the television with a plurality of LED's (Light Emitting Diode) or a plurality of LCD's (Liquid Crystal Display), so that there are limits to effectively control the channel or the like due to the relatively complicated structure thereof.

In addition, people watching the television program cannot control the content of the keypad commands or the remote controller on the screen since many of the commands from the keypad or the remote controller are displayed on the LCD disposed thereon, so that the television watcher cannot effectively control the desired channel and the like.

SUMMARY OF THE INVENTION

Accordingly, it is an object of the present invention to provide an on-screen signal generating apparatus for a cable television capable of displaying the control commands from the keypad or the remote controller on the screen while watching television.

To achieve the object, the present invention includes a memory circuit for storing color information for each pixel needed for display of the on a screen; a main control circuit for outputting color information stored in the memory circuit and for generating input/output port selection signals and writing signals; and a high frequency modulation circuit for providing on-screen combined video signals combining the color information generated by the main control circuit and the synchronous signals from the combined video signals of the decoder circuit.

BRIEF DESCRIPTION OF THE DRAWINGS

The objects and features of the invention may be more readily understood with reference to the following detailed description of an illustrative embodiment of the invention, taken together with the accompanying drawings in which.

DESCRIPTION OF THE PREFERRED EMBODIMENTS

Figure 1:
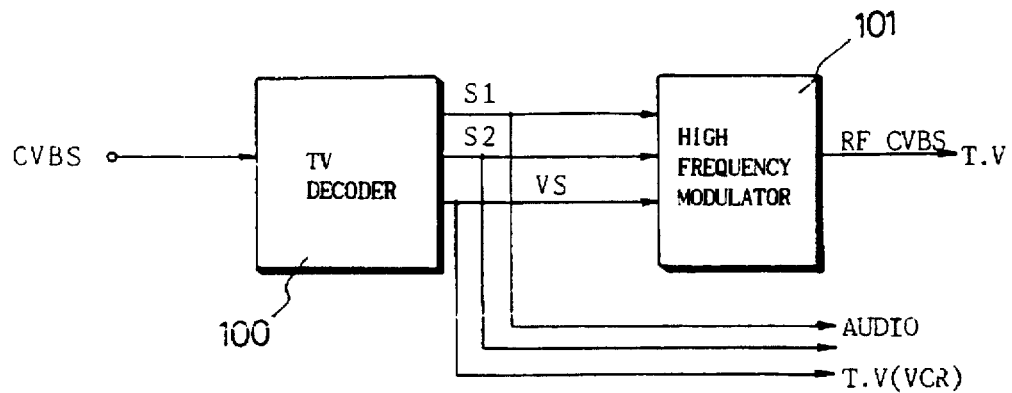
FIG. 1 is a block diagram showing a signal generating apparatus structure of a conventional cable television.
Figure 2:
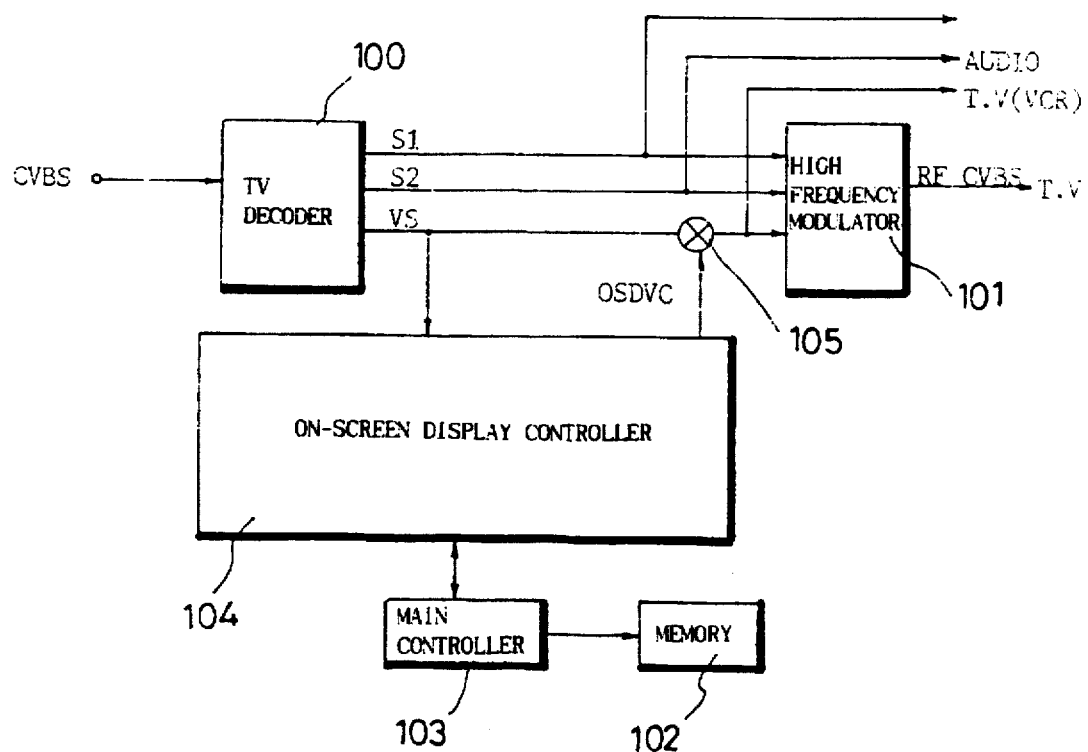
FIG. 2 is a block diagram showing an on-screen signal generating apparatus structure for cable television according to the present invention.

Referring to FIG. 2, the present invention includes a decoder circuit 100 for decoding input combined video signals CVBS and for transmitting the left/right audio signals S1 and S2 and video signals Vs to an audio system and a VCR(Video Cassette Tape Recorder); a memory circuit 102 containing a look-up table for storing color information for displaying the remote control command information on the screen; a main control circuit 103 for receiving the keypad command data and for reading the color information stored in the memory circuit 102 for the received commands and for generating input/output port selection signals PS which are needed for the on-screen display; an OSD control circuit 104 for receiving the color information, the input/output port selection signals PS and the writing signals WS, which are outputted from the main control circuit 103, and for receiving the synchronous signals from the video signals VS inputted from the television decoder circuit 100 and for outputting the on-screen combined video signals; a signal combining circuit 105 for combining the on-screen combined video signals OSDCV generated at the OSD control circuit 100 and the video signals VS of the television decoder circuit 100; and a high frequency modulation circuit 101 for modulating the combined video signals from the signal combining circuit 105 and the left/right audio signals S1 and S2 of the decoder circuit 100 to the high frequency signals and for transmitting the signals to the video system and the audio system as the screen display signals RF CVBS of the television.

The OSD control circuit 104 includes a synchronous detecting circuit 104a for detecting the synchronization signals SY from the video signals vs of the television decoder circuit 100; an OSD generating circuit 104b for outputting the color data as analog signals in response to writing signals ws and the input/output selecting signals PS, which are outputted from the synchronous signals SY detected at the synchronous detecting circuit 104a and the main control circuit 103; and a combined video signal generating circuit 104c for changing the color information signals for each of the pixels generated at the OSD generating circuit 104b to the on-screen combined video signals OSDVC in response to the synchronous signals of the synchronous detecting circuit 104a.

In addition, the OSD generating circuit 104b includes a clock divider circuit 200 for dividing the external system clock SCLK in response to the synchronous signals SY detected at the synchronous detecting circuit 104a; a pulse generating circuit 201 outputting interrupt signals at every ascending edge of the clock signals divided from clock divider circuit 200 and for controlling the main control circuit 103; first to third latch circuits 203 to 205 for latching the Red, Green and Blue color information data PD of from the main control circuit 103 in response to input/output port selecting signals PS and writing signals ws, which are generated at the main control circuit 103 in response to the interruption signals INT of the pulse generating circuit 201; an inverter 202 for inverting the clock signals generated at the clock divider circuit 200; first to third digital/analog converting circuit 206 to 208 for converting the Red, Green and Blue color information PD latched at the first to third latch circuit 203 to 205 and for outputting the signal to the combined video signals generating circuit 104c.

Figure 3:
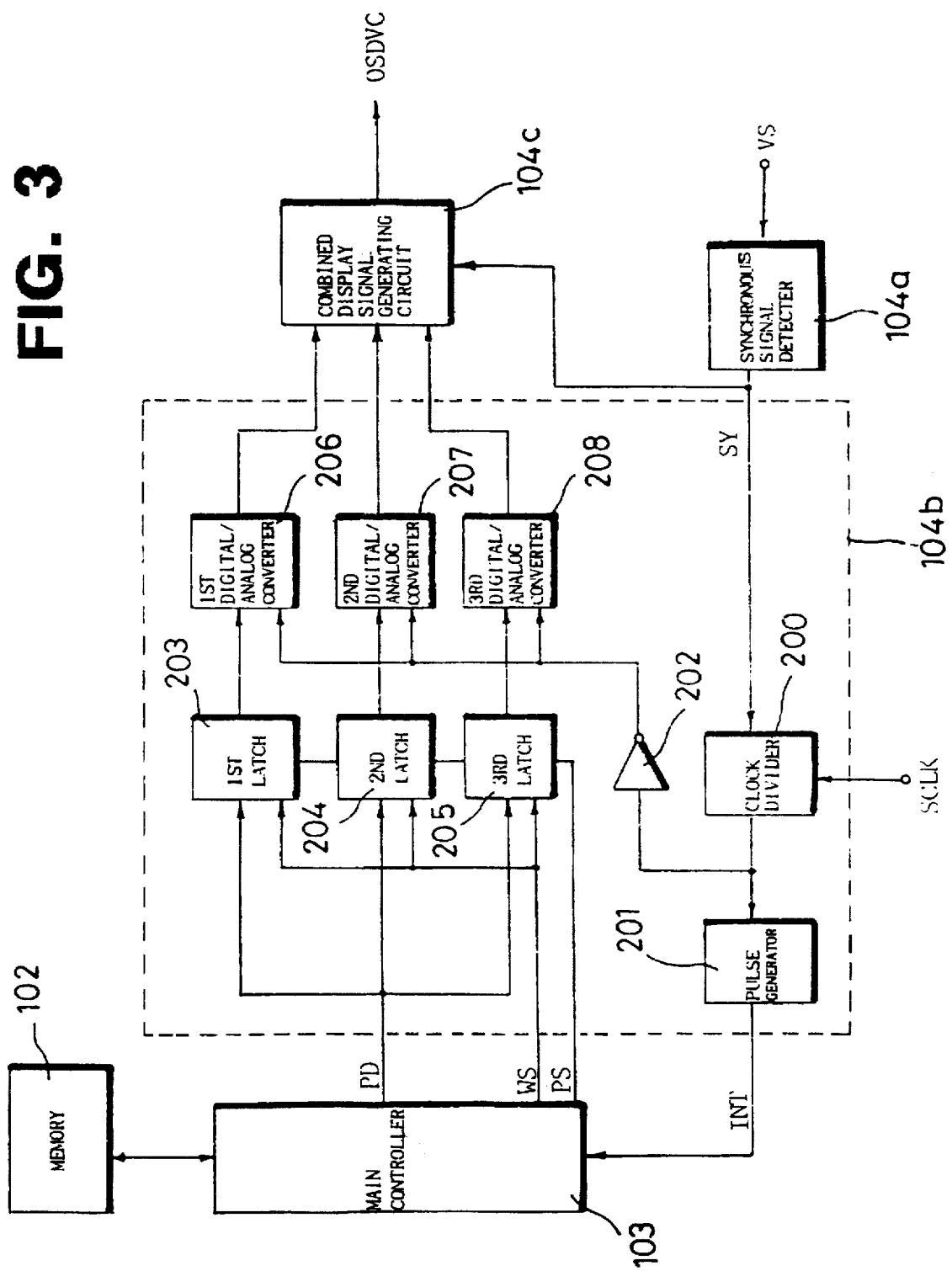
FIG. 3 is a block diagram showing the on-screen display control circuit of FIG. 2.

The operation of the present invention will now be explained with reference to FIGS. 2 to 4.

To begin with, the input combined video signals CVBS are decoded to left, and right audio signals S1 and S2 through the television decoder circuit 100. The left and right audio signals S1 and S2 are transferred to the high frequency modulation circuit 101 and the external audio system. The video signals VS are inputted to the synchronous detecting circuit of the OSD control circuit 104 and the signal combining circuit 105.

Figures 4A, 4B, 4C, 4D, 4E:
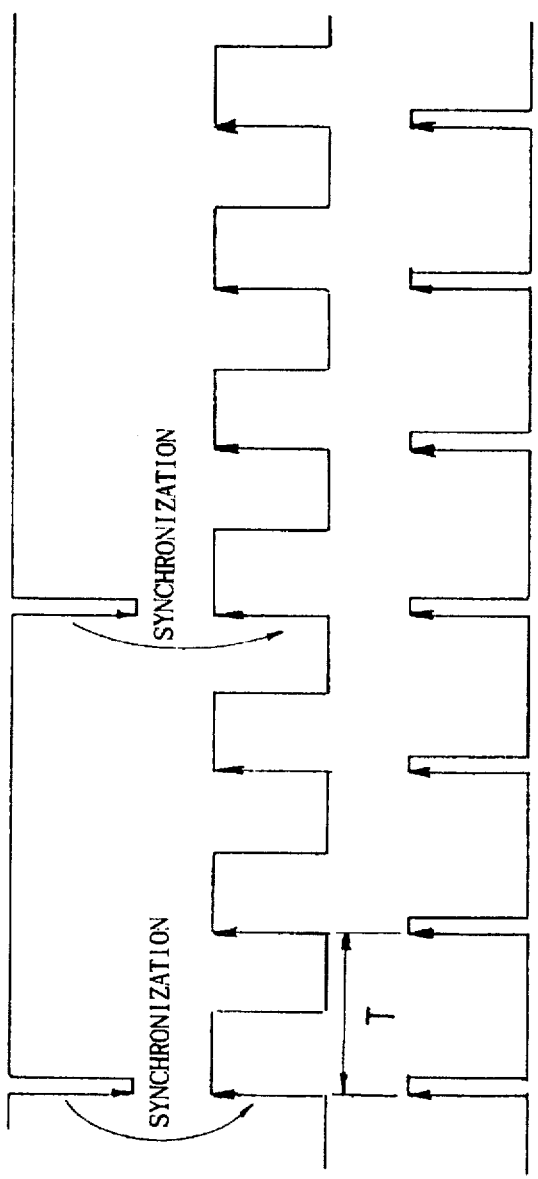
FIG. 4A is a waveform diagram showing a synchronous signal of the synchronous detection circuit.
FIG. 4B is a waveform diagram showing the output of the clock divider.
FIG. 4C is a waveform diagram showing the output of the pulse generating circuit.
FIG. 4D is a waveform diagram showing the output of the inverter.
FIG. 4E is a waveform diagram showing signals generated at first latch to third latch and the first digital/analog converter to the third digital/analog converter.

The synchronous detecting circuit 104a of the OSD control circuit 104 detects the synchronization signals, as shown in FIG. 4A, from the video signals VS inputted from the television decoder circuit 100 and inputs the detected signals to the combined video signals generating circuit 104c and the clock divider circuit 200 of the OSD generating circuit 104b.

The clock divider circuit 200 inputs the divided pulse, as shown in FIG. 4B after dividing the input system clock signals SCLK reset at the descending edge of the synchronization signals, as shown in FIG. 4, inputted from the synchronization detecting circuit 104a.

A cycle of a pulse, as shown in FIG. 4B, refers to one cycle required to transfer one pixel of the display.

The pulse generating circuit 201 is an interrupt generating apparatus control the main control circuit 103 needs in response to the clock inputted from the clock divider circuit 200. That is, the pulse generating circuit 201 is directed to input the interrupts signals INY, as shown in FIG. 4C, to the main control circuit 103 at every ascent of the signal inputted from the clock divider circuit 200.

The main control circuit 103 reads the color information such as Red, Green and Blue data PD for each pixel stored in the memory every time the interrupt signal INT occurs from the pulse generating circuit 201. It outputs the RGB color data to first to third latch circuits 203 to 205 of the OSDF generating circuit 104b. It also outputs to the latches the input/output port selection signals PS and the writing signals WS.

At this time, the first to third latch circuits 203 to 205 latch the RGB color data PD of the pixels outputted from the main control circuit 103, as shown in FIG. 4E, and output the latched signals to the first to third digital/analog converters 206 to 208. At this time, the data latched at the first to third latch circuits 203 to 205 is conducted same as shown in FIG. 4B and the RGB color data PD is latched as shown in FIG. 4E.

Meanwhile, the clock signals, as shown in FIG. 4B, outputted from the clock divider circuit 200 are inverted through the inverter 202, as shown in FIG. 4D and the inverted signals are outputted to the output enable terminal of the first to third digital/analog converters 206 to 208.

The first to third digital/analog converters 206 to 208 convert the RGB color data, latched by the first to third latch circuits 203 to 205 analog color signals responsive clock signals from inverter 202.

That is, the first to third digital/analog converters 206 to 208 convert the RGB color data latched by the first to the third latch circuits 203 to 205 from the descending period T1 of the clock signals inputted from the inverter 202 into the color signals of RGB analog at the clock signal ascending period T2 of the inverter 292 and output the converted signals to the combined video signal generating circuit 104c.

The combined video signal generating circuit 104c converts RGB analog color signals inputted from the first to third digital/analog convertor circuits 206 to 208 to the on-screen combined video signals in response to the synchronous signals SY, as shown in FIG. 4A, detected at the synchronous detecting circuit 104a and outputs these to the signal combining circuit 105.

The signal combining circuit 105 combines the on-screen combined video signals OSDVC generated at the combined video signal generating circuit 104c of the OSD control circuit 104 and the video signals VS inputted from the television decoder circuit 100 and transfers the combined signals to the external VCR, the television or the high frequency modulation circuit 101.

The high frequency modulation circuit 101 modulates the combined video signal inputted from the signals combining circuit 105 and the left and, right audio signals S1 and S2 inputted from the decoder circuit 100 and outputs the modulated signals to the screen as video signals RF CVBS.

As described above, the user is available to use the user-interface screen using the remote controller or the keypad while watching the television program as well as a wide range of color selections by using the on-screen display of to the cable television signal output apparatus.

Although the preferred embodiments of the present invention have been disclosed for illustrative purpose, those skilled in the art will appreciate that various modification, additions and substitution are possible, without departing from the scope and spirit of the invention as recited in the accompanying claims.

What is claimed is:

1. An on-screen signal generating apparatus for displaying control commands combined with a video signal in a cable television system, comprising:

memory means for storing color information for each pixel needed for displaying the control commands;

at least one latch;

main control means for outputting the color information stored in the memory means for each control command to the at least one latch and for generating input/output port selection signals and writing signals for the at least one latch to control the latch to input and output the color information in synchronization with the video signal;

means for combining the color information from the at least one latch with the video signal for generating a combined video signal; and high frequency modulation means for modulating the combined video signal.

2. The apparatus of claim 1, further comprising synchronous detection means for detecting synchronization signals from the video signal; and D/A convertor means for receiving the color information from the at least one latch in response to the input/output port selection signals and writing signals and the synchronization signals and for outputting an analog signal corresponding to the color information for the control command.

3. The apparatus of claim 2, wherein i) the synchronous detection means comprises clock divider means for dividing an external system clocks in response to the synchronization signals and pulse generating means for controlling the main control means by generating interrupt signals in response to the clock signals divided at the clock divider means; ii) the at least one latch comprises first to third latch means for latching the color information from the main control means; and iii) the D/A convertor means comprises first to third D/A converting means for converting the color information latched at the first to third latch means.

4. The apparatus of claim 3, further comprising an invertor for enabling the first to third D/A converting means by inverting the clock signals obtained at the clock divider means.

5. The apparatus of claim 3, wherein the pulse generating means generates the interruption signals at the ascension of the clock signals from the clock divider means.

6. The apparatus of claim 3, wherein the clock divider means is reset at the descending edge of the synchronization signal obtained at the synchronous detecting means and divides the input system clock into two parts.

7. The apparatus of claim 3, wherein the clock divider means divides the output thereof into two parts and latches the color information of the main control means to the first to third latch means during a descending period of the divided clock signals and converts the color information of the main control means to analog signals at the first to third D/A converting means during an ascending period.

8. The apparatus of claim 6, wherein the clock divider means divides the output thereof into two parts and latches the color information of the main control means to the first to third latch means during a descending period of the divided clock signals and converts the color information of the main control means to analog signals at the first to third D/A converting means during an ascending period.

\* \* \* \* \*